INVENTOR
H.C. SIBLEY

BY Forest B. Hitchcock
HIS ATTORNEY

Nov. 24, 1970 H. C. SIBLEY 3,543,236

CHECKING CIRCUIT

Filed April 10, 1968 2 Sheets-Sheet 2

INVENTOR
H.C. SIBLEY

BY Forest B. Hitchcock

HIS ATTORNEY

United States Patent Office 3,543,236

Patented Nov. 24, 1970

3,543,236

CHECKING CIRCUIT

Henry C. Sibley, Adams Basin, N.Y., assignor to General Signal Corporation, Rochester, N.Y., a corporation of New York

Filed Apr. 10, 1968, Ser. No. 720,255

Int. Cl. H03k *13/34;* H04l *1/10*

U.S. Cl. 340—146.1 11 Claims

ABSTRACT OF THE DISCLOSURE

The checking circuit system guards against unintended energization of a single conductor in applications where it is intended that certain conductors be energized only in pairs. A pair of transistors is provided for each pair of conductors to be monitored. The outputs of these two transistors are connected through a full wave rectifier to the stick circuit of a check relay picked up by a momentary energization. When both transistors are conductive or non-conductive energy is supplied to the stick circuit; but if either transistor becomes conductive while the other is non-conductive, the stick circuit is interrupted. Such de-energization of the check relay opens the contact controlling the vital circuit to prevent an erroneous operation.

In a second form, two transistors are used for each conductor of a pair of conductors. One of the two transistors is rendered conductive by one polarity of potential on its conductor; the other transistor is rendered conductive by the opposite polarity of potential on the same conductor. All four transistors have their outputs connected to the input of a bridge rectifier which is in turn connected to the stick circuit of the check relay. When the pair of conductors is energized with opposite polarities in either order, an input is supplied to the stick circuit of the check relay. But if one or more of the transistors fails to respond to its polarity, or if one of the transistors becomes erroneously conductive, the input to the stick circuit of the check relay is interrupted.

BACKGROUND OF THE INVENTION

This invention relates to checking circuitry and more particularly to circuitry for guarding against the unintended energization of a single conductor in applications where it is intended that conductors be energized only in pairs.

In many applications, in computer circuitry and in code communication systems, it is intended that certain conductors be energized only in pairs. In such instances, the appearance of a voltage on a single conductor is indicative of a malfunction.

The checking system of the present invention in addition to providing energization of a check circuit means only if both conductors of a pair are energized, also provides in the event energization of such conductors ceases, such de-energization will become effective to drop out the check circuit means after an accurate predetermined time. Such accurate predetermined time is provided by the use of timing capacitors and resistances; but such apparatus is subject to malfunction. It is in a case of this kind that the check circuit means becomes extremely useful.

Thus, an object of this invention provides a timing circuit which is accurate in its function and which is fail-safe in its organzation.

Another object of this invention is to provide a fail-safe check upon the energization of a pair of conductors and thus assure that the apparatus associated with both such conductors is properly operative.

SUMMARY OF INVENTION

Briefly, the invention contemplates a checking circuit system for verifying the coincident appearance of predetermined voltages on a pair of conductors. A pair of switching means, one connected to one conductor, and the other connected to the other conductor, is associated with the pair of conductors, and each switching means is adapted to be rendered conductive when a predetermined voltage appears on its related conductor. A checking means is adapted to be energized. Suitable circuit means is provided between the checking means only when the switching means are simultaneously conductive. Other circuit means connects the switching means and the checking means for energizing it only when the switching means are simultaneously non-conductive.

Further, the checking circuit system of this invention is for verifying the coincident presence of voltages on a pair of conductors. A pair of switching means one connected to one conductor, the other connected to the other conductor is assciated with the pair of conductors. Each switching means is rendered conductive when a predetermined voltage appears on its related conductor. Checking means is provided and is adapted to be energized. Suitable circuit means is connected to said pair of switching means and to said checking means for energizing it when said pair of switching means are conductive, but the circuit means is effective to cause de-energization of the checking means if either switching means is conductive alone. There is, of course, other circuit means controlled by said checking means.

A further form of the invention is for verifying the periodic appearance of voltages of opposite polarities on a pair of conductors alternately. A pair of switching means is connected to one of said conductors so that each of the switching means is rendered conductive by a different polarity. Another pair of switching means is connected to the other of said conductors, if each of such switching means is rendered conductive by a different polarity but in opposite relationship to the first pair of switching means. A bridge rectifier circuit is provided with input terminals and output terminals. Circuit means is provided for connecting the outputs of one pair of switching means to one input of the bridge circuit; and is also effective for connecting the outputs of said other pair of switching means to the other input of the bridge circuit. Checking circuit means is connected to the output of said rectifier bridge whereby the periodic reversal of polarities on the pair of conductors provides substantially continuous energization of the check circuit means.

The present invention also provides a check circuit system wherein a stick relay is provided with a momentary energizing circuit for initially energizing the stick relay. Stick circuit means including a front contact of the relay is connected to the output terminals of a bridge connected rectifier. Switching means are connected to one conductor to supply positive energy to the input of the bridge rectifier when the particular polarity of such conductor renders such switching means conductive. Further switching means is connected to the other conductor and supplies negative energy to the input of bridge rectifier when the particular polarity of such conductor renders said switching means conductive. There is additional circuit means for supplying the bridge rectifier with input energy when said conductors are not energized with the above particular polarities specified.

For a better understanding of the present invention, together with other and further objects thereof, reference is had to the following description, taken in connection with the accompanying drawings, while its scope will be pointed out in the appended claims.

DESCRIPTION OF THE PREFERRED EMBODIMENTS

Figure 1:
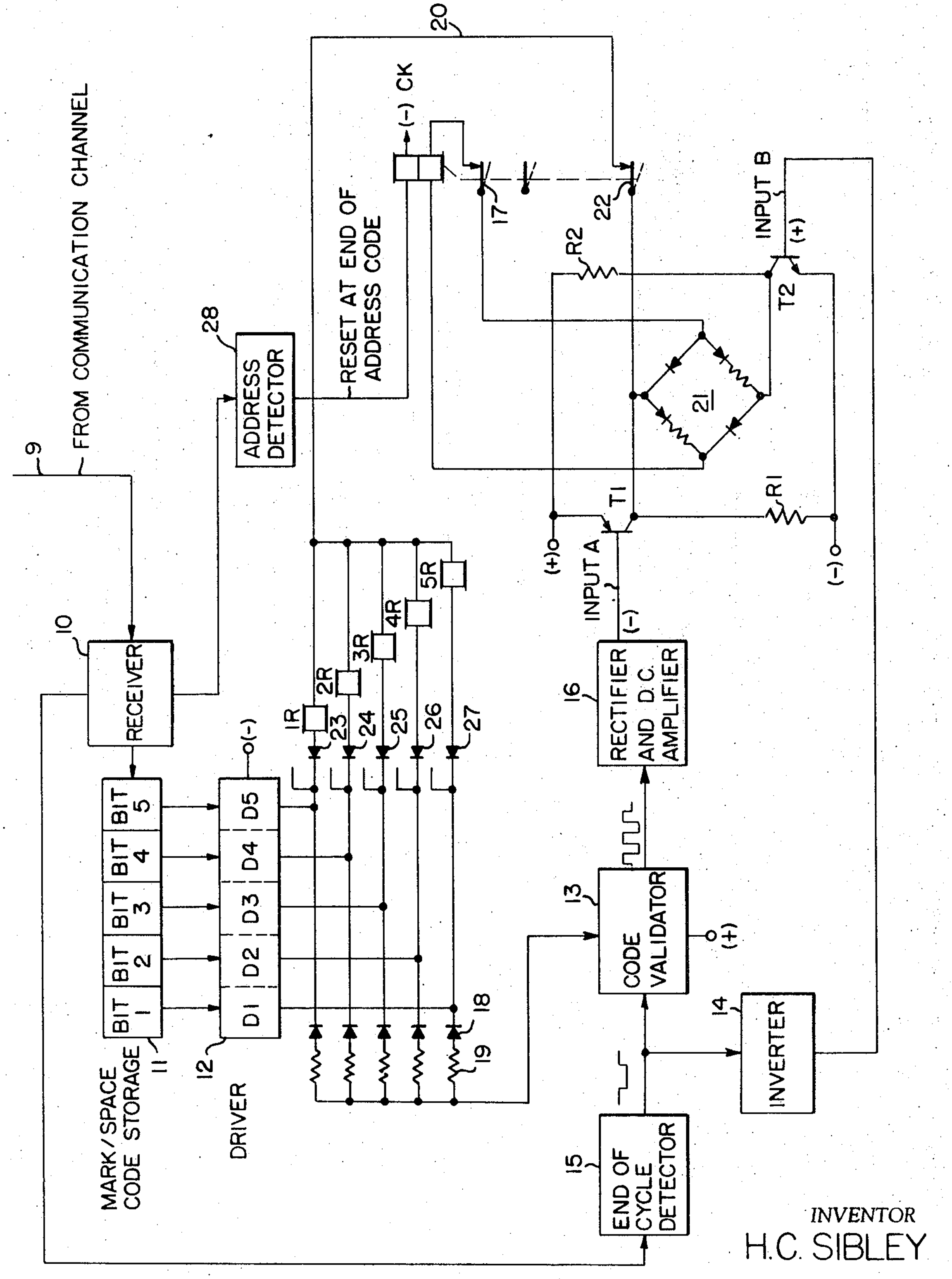
FIG. 1 is a circuit diagram, partly in block form, showing the invention in one form as applied to a mark-space code communication system.

Referring first to FIG. 1, there is shown receiving apparatus for a mark-space code communication system such as disclosed in my prior application Ser. No. 588,042 filed Oct. 20, 1966 and now Pat. No. 3,492,643 issued Jan. 27, 1970. Such communication system is of course, abbreviated in block form and provides a receiver 10 for receiving codes over a communication channel 9. The codes are received serially by the receiver 10, and converted to parallel output for the respective bits of the code as by the use of a shift register (not shown) or other comparable means. The receiver 10 is thus illustrated as having an output for setting up a mark-space code storage 11 which code storage has output means for the respective bits of a stored code. Outputs for the respective bits of the code stored in the code storage 11 are applied to a driver 12 which has driver circuit units or stages for the respective bits designated as D1, D2, D3, D4 and D5 respectively for a five-bit code. Each of these driver stages has on output lead for the associated bit of the code. Outputs are generated on these leads for mark elements, and no output is generated on these leads for space elements.

The outputs generated for mark elements are in the form of negative pulses from the negative connection (—) on the right side of D5. If the delivery line or wire 20 is rendered positive simultaneously with the reception of a completed code, execution relays 1R–5R will be selectively energized. Since front contact 22 of the check relay CK is included in wire 20 it is assured that the execution relays will not be falsely energized.

A code validator 13 is provided for checking the validity of the code output of the driver 12. This device may be in the form shown in applicant's above mentioned pending application U.S. Ser. No. 588,042, filed Oct. 20, 1966 and now Patent No. 3,492,643 issued Jan. 27, 1970. Briefly, the code validator 13 operates as follows. At the end of a code cycle, the end of cycle detector 15 emits a pulse marking an execution time. This end of cycle pulse enables the code validator 13 so that it will emit an A.C. output if and only if the proper number of mark elements are present in the code stored in driver 12. This A.C. output is supplied to rectifier-amplifier 16. After rectification and amplification, the output of the code validator via rectifier-amplifier 16 is applied to the base of transistor T1 in the form of a negative potential driving it conductive.

Simultaneous with the rendering conductive of the transistor T1 by the execution pulse from the end of cycle detector 15 as above explained, the same execution pulse is also fed from the end of cycle detector 15 through the inverter 14 to supply positive (+) energy to the base of transistor T2 to cause such transistor to be rendered conductive. It is thus apparent that transistors T1 and T2 will receive voltages at their bases simultaneously which will result in their being rendered conductive simultaneously. With both transistors in their conductive state, energy will be supplied to the rectifier bridge 21 and the relay CK will be maintained energized. This energy for energizing the stick circuit of relay CK flows from (+), through transistor T1, to the upper input terminal of rectifier 21, through the upper left hand leg of rectifier 21, to the lower winding of relay CK, through its stick contact 17 to the right hand terminal of rectifier 21, through the lower right hand leg of rectifier 21, through transistor T2, to (−). This stick circuit must be initially established by the picking up of the front contact 17 of the relay CK at an appropriate time. This is done by the address detector 28 at the end of the reception of the address for this station.

It is contemplated that messages received by receiver 10 will be applicable to a number of different locations. In each location, there would be equipment similar to that shown in FIG. 1. The first part of a coded message will determine the location to which the second part of the message applies. Thus reception of an address for the location shown in FIG. 1 causes the address detector 28 to give a momentary pulse for initially energizing check relay CK through its upper winding.

The resetting of the check relay CK at the start of each message for the location of FIG. 1 causes the relay to be energized by a holding stick circuit. Such holding stick circuit begins at (+), through resistor R2, lower input terminal to rectifier 21, through the lower left leg of rectifier 21, through the lower winding of relay CK, front contact 17 of relay CK, through the upper right hand leg of rectifier 21, through resistor R1, to (−).

This holding stick circuit is maintained closed so long as both of the transistors T1 and T2 are simultaneously non-conductive. However, if either of the transistors T1 or T2 is rendered conductive without the other, this holding stick circuit is opened and the check relay CK is released.

For example, during the reception of the message and storage in the drive 12, the check relay CK has been reset by a momentary pulse from address detector 38. It is being maintained energized by the above pointed out holding stick circuit. If during the execution period, the transistor T1 is rendered conductive while the transistor T2 remains non-conductive, the input to the rectifier unit 21 is eliminated. If the situation is reversed and the transistor T2 is rendered conductive and T1 non-conductive then the positive connection to the rectifier 21 is eliminated. In this way the failure of any of the preceding control devices results in the dropping of check relay CK. This prevents the application of effective energy through contact 22 and wire 20 to the execution relays 1R through 5R.

The delivery line 20 is driven by transistor T1. Normally, if transistor T1 were to fail by shorting, the delivery line 20 would be maintained continuously energized. As can be seen from the drawing, protection from this danger is provided by contact 22. If transistor T1 remains on continuously, the relay CK will drop as soon as transistor T2 becomes non-conductive. Once relay CK drops, breaking the contact at 22, no energization of the execution relays 1R–5R will occur. Also, when the transistor T1 becomes conductive alone (i.e. when T2 fails to become conductive), relay CK drops away quickly before relays 1R–5R have a chance to respond to the energy momentarily connected to line 20.

When a cycle for the station of FIG. 1 is completed, the system continues to transmit to other stations. This causes the repeated operation of the end of cycle detector 15 which operates to cause T2 to be repeatedly conductive. This releases check relay CK in readiness for checking another operation of the station of FIG. 1.

Figure 2:
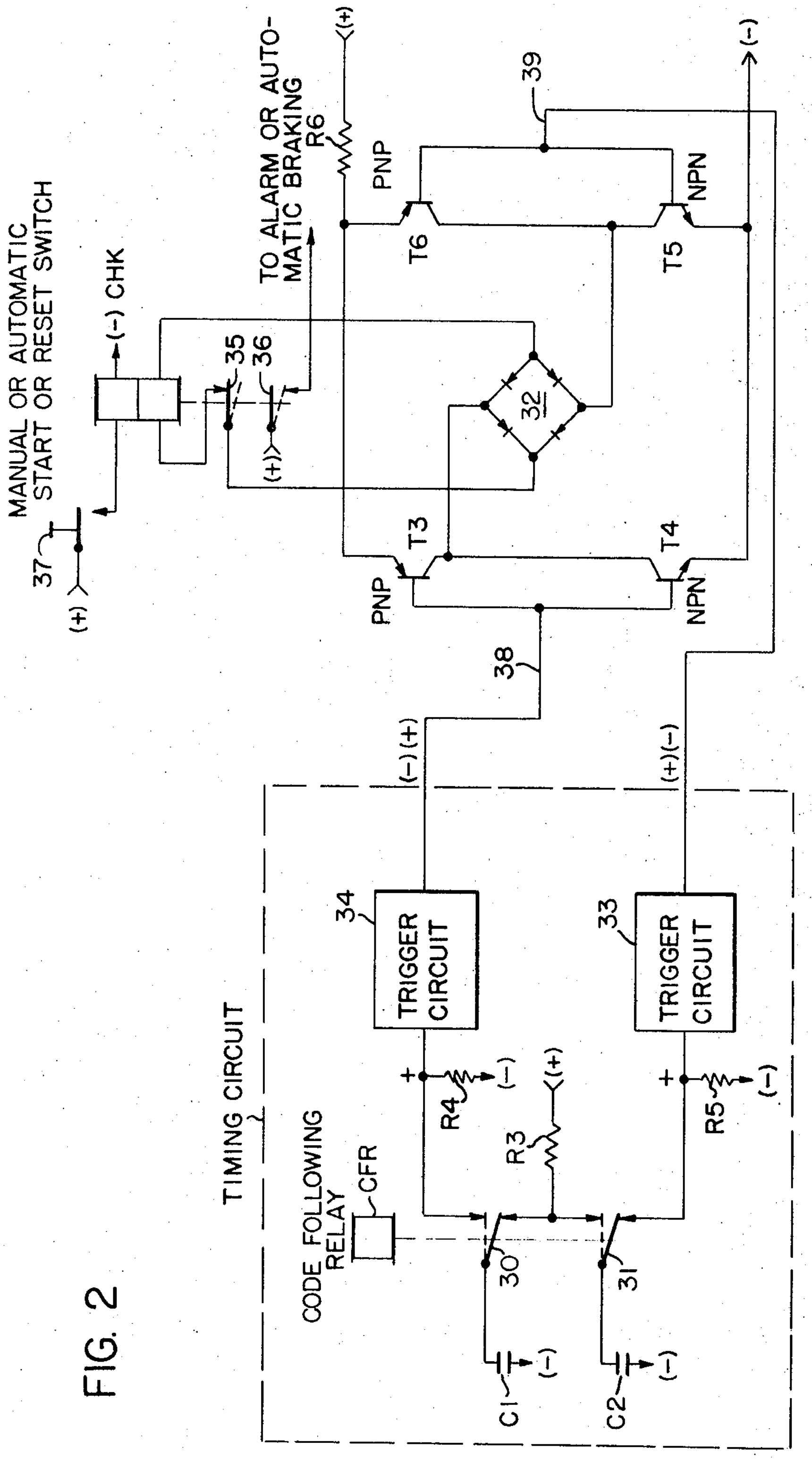
FIG. 2 is a circuit diagram, partly in block form, showing a modified form of the invention applied to a code receiving relay of a conventional type train control system.

FIG. 2 shows a modified form of this invention used in connection with a train control system of the continuous inductive type. The train carried equipment includes a code receiving relay CFR, which under safe conditions is continuously repeating or following the code on the trackway. The operation of the code following relay CFR is effective through the apparatus disclosed in FIG. 2 to maintain the check relay CHK energized through its stick circuit as hereinafter explained, assuming that the relay CHK has been initially picked up by the manual or automatic start or reset switch 37. In the absence of code, the relay CFR ceases to operate and results in the de-energization of the relay CHK and the application of the brakes or other warning apparatus within a predetermined time after the code initially ceases to be received.

More specifically, the code receiving relay CFR operates its contacts up and down in accordance with code rates received. When contact 30 is in the position shown, (+) is connected through resistor R3 to the upper terminal of capacitor C1 to charge the capacitor. When contact 30 closes its front point, capacitor C1 is connected to the resistor R4 to (—) and discharges in a predetermined measured period of time. During the period of discharge, positive energy is supplied to the input of a trigger circuit 34 for producing a positive (+) output to wire 38 instead of the negative (—) output applied to wire 38 when there is no capacitor connected to R4 and trigger circuit 34 as shown.

Assuming that the capacitor C2 was charged through the resistor R3 during a preceding picked up condition of relay CFR, such capacitor C2 is now discharging through back contact 31 and resistor R5. During the time period of discharge, positive energy is applied to the trigger circuit 33 causing a positive (+) output voltage on wire 39. When the capacitor C2 is disconnected by contact 31, a negative (—) voltage is applied to wire 39.

In other words the capacitors C1 and C2 are alternately charged and only partially discharged during the continuous regular operation of the code following relay CFR. Actually, neither capacitor is discharged to a value which will cause the associated trigger circuit to operate to its opposite condition during the usual time contacts 30 and 31 are in a given position. Such switching of the trigger circuits occurs when the contacts of the code following relay shift to their opposite positions.

The trigger circuits may be of any suitable type, such as a well-known Schmitt trigger circuit with suitable associated apparatus for placing positive and negative pulses on the output conductors or wires 38 and 39. Each output conductor or wire, such as wire 38, has a PNP type transistor T3 with its base connected to the wire 38. Such transistor T3 is rendered conductive by the presence of a negative (—) pulse and is rendered non-conductive in the presence of zero voltage or a positive (+) pulse. The converse is true of the NPN type transistor T4 which is rendered conductive in response to a positive (+) pulse and is rendered non-conductive in the presence of a zero or negative (—) pulse. Similar apparatus is associated with the wire 39.

The output of collector terminals of the transistors T3 and T4 are connected together to the upper input terminal of the bridge rectifier 32. Similarly the output or collector terminals of the transistors T5 and T6 are connected together to the lower input terminals of bridge rectifier 32.

The input or emitter terminals of transistors T3 and T6 are connected to the positive terminal (+) of a suitable source through resistor R6. The output or emitter terminals of transistors T4 and T5 are connected together to the negative source (—). The left and right terminals of rectifier 32 are connected to the stick circuit of the relay CHK including its front contact 35.

The overall operation of the circuit is as follows. Starting with the relay contacts just arriving at the positions shown, and assuming that capacitor C2 has been charged, it is apparent that trigger circuit 33 will provide a positive signal (+) on conductor 39 while trigger circuit 34 will provide a negative signal (—) on conductor 38. With this configuration of outputs, transistors T3 and T5 are rendered conductive. The rectifier bridge 32 receives inputs at its upper and lower terminals, and an output from its left and right terminals maintains relay CHK energized.

When the contacts of the code receiving relay shift to their upper position, capacitor C1 will provide a positive (+) input to trigger circuit 34, causing a positive signal (+) to be impressed upon conductor 38 by trigger circuit 34. Trigger circuit 33, whose input is now removed, will revert to its normal state in which a negative signal (—) is impressed upon conductor 39. At this point, transistors T3 and T5 have been rendered non-conductive. An input, although of different polarity, is therefore provided to the rectifier bridge 32 for maintaining the relay CHK energized with the same polarity. It should be mentioned that the relay CHK is just sufficiently slow to release to provide sufficient time for the code following relay CFR contacts to shift from one position to the other without dropping the relay CHK.

It can now be appreciated that what the circuit, including transistors T3, T4, T5, T6, rectifier bridge 32, and relay CHK, accomplishes is a checking function. As long as relay CHK is energized, it is clear that either transistor pair T3 and T5 or transistor pair T4 and T6 must be conductive. This, in turn, means that the conductors controlling these transistor pairs are coincidentally energized. Note that if a transistor fails by opening, the relay CHK will be dropped. Similarly if a transistor fails by shorting, the relay CHK will be dropped. Thus, protection is provided against failure in the checking circuit itself.

The outputs from the trigger circuits 33 and 34 are complementary, that is, one output provides a positive signal while the other provides a negative signal, and vice versa. With an input provided to a timing circuit (either R4 or R5), such a timing circuit will provide its positive output to the associated trigger circuit until the capacitor, either C1 or C2, as the case may be, is fully discharged. However, as above mentioned, a timing circuit does not fully discharge a capacitor during operation of the code following relay CFR; but in the event the relay CFR ceases its operation, the capacitor then becomes fully discharged in accordance with its time constant. During the discharge when the reduction of the capacitor voltage has reached a predetermined value, then the trigger circuit shifts to its opposite position, the same as if no positive voltage were supplied to it. In other words the shift of the trigger circuit does not await the full discharge of the capacitor but operates at a triggering point.

Under circumstances of this kind where the relay CFR ceases operation, the check relay CHK is thus assured of being released within a predetermined time following such cessation of operation. This time is accurately measured by the capacitor-resistor timing circuit which is considerably more accurate than the use of slow release relays and the like.

It can therefore be seen that the continued operation of the code following relay and the continuous response of all devices is required in order to maintain the check relay CHK picked up through its stick circuit.

In the above description of FIG. 2 the check circuit organization is applied to a cab signal train controlling organization, but it should be understood that the same organization may be substituted for that shown in FIG. 1 as applied to a communication type of system.

In FIG. 1 the rectifier and D.C. amplifier 16 are described as providing negative (—) output pulses; but in actuality this negative pulse is with regard to a positive (+) condition on the circuitry which renders the transistor T1 non-conductive. A similar situation is true with regard to the inverter 14 which is described with regard to FIG. 1 as providing a positive (+) output pulse. Such a positive (+) pulse is, or course, positive with respect to the normal negative (—) condition of the circuitry.

It is thus seen that the input wire A of FIG. 1 may be connected directly to the wire 38 of FIG. 2, and the input wire B can be connected directly to the wire 39 of FIG. 2. This substitution thus provides active transistors in place of the resistors R1 and R2 of FIG. 1 and thus provides a checking organization even safer than that shown in FIG. 1.

Several forms of checking circuits have been disclosed herein. It will be apparent to those skilled in the art that there are further possible modifications and changes that can be made in these circuits for other uses. The claims which follow are intended to embrace within their scope all those modifications which fall within the spirit and scope of the invention.

What I claim is:

1. A checking circuit system for verifying the coincident appearance of predetermined voltages on a pair of conductors and enabling the transmission of control signals to associated control devices in response thereto comprising:

checking means operative when energized for conducting the control signals to the associated devices;

a complementary pair of solid state switching means, one connected to one conductor, the other connected to the other conductor, each switching means adapted to assume one of two conductance states when a predetermined voltage appears on its related conductor;

circuit means responsive to said switching means and to said checking means for energizing said checking means only when both switching means are in the same conductance state, and deenergizing said checking means when said switching means are in opposite conductance states, whereby a failure in the conductance states of the switching means deactivates the checking means and disables transmission of control signals.

2. The checking circuit system of claim 1 wherein the complementary pair of switching means comprises:

two transistors, one a PNP type and the other an NPN type, each transistor adapted to be in the same conductance states for opposite polarity signals on said conductors.

3. The checking system of claim 1 wherein said checking means is a relay having a stick circuit, and said relay maintained by said circuit means over said stick circuit when said switching means are in the same conductance state.

4. The checking system of claim 3 which includes means for initiating energization of said stick relay to pick it up and render it subject to energization by said stick circuit, whereby failure of said circuit means to maintain said stick relay energized indicates failure of simultaneous response of said switching means to energization of said pair of conductors.

5. A checking circuit system for verifying the coincident presence of voltages on a pair of conductors comprising:

a pair of switching means, one connected to one conductor, the other connected to the other conductor, each adapted to be rendered conductive when a predetermined voltage appears on its related conductor, a check relay with a stick circuit, holding circuit means for energizing said stick circuit when both said switching means are non-conductive, circuit means rendering said holding circuit inactive when either of said switching means is rendered conductive, and additional circuit means rendered effective for energizing said stick circuit means only when both said switching circuit means are rendered conductive, whereby other means are controlled by said check relay.

6. A code rate checking circuit system for verifying the periodic appearance of voltages of opposite polarities on a pair of conductors alternately and enabling the transmission of control signals to associated control devices in response thereto comprising:

(a) checking means operative when energized for conducting the control signals to the associated devices, (b) two complementary pair of solid state switching means each pair connected to one of said conductors each complement of said switching means being rendered conductive by a different polarity impressed thereon, for energizing, the checking means when said solid state devices are in complementary conductance states;

(c) timing means having its output coupled to the conductors governed by the code for producing outputs of opposite polarity and fixed duration for each code pulse, and said timing means impressing outputs of the same polarity for code rates below a predetermined frequency thereby a failure of the code to appear drives the switching means to non-complementary conductance states and deactivates the checking means, disabling the transmission of the control signals.

7. The code rate checking system of claim 6 wherein each pair of solid state switching means includes:

two transistors, one a PNP type and the other an NPN type, each transistor adapted to be in an opposite conductance state in accordance with the polarity of the conductors.

8. The code rate checking system of claim 6 wherein said checking means includes:

a solid state bridge rectifier circuit coupled to the switching means, for establishing current polarity for maintaining the checking means energized.

9. The code rate checking system of claim 8 wherein said checking means further includes:

a relay having a stick circuit adapted to be energized coupled to outputs of said bridge rectifier circuit for enabling the transmission of control signals to associated control devices when energized.

10. A code rate checking system having a code receiving relay, the improvement comprising:

a first timing means, including a trigger circuit, operated by a front contact of said code receiving relay to measure a predetermined time longer than the time between successive operations of said relay for providing distinctive outputs for closed front and back contact positions respectively, a second timing means, including a trigger circuit, operated by a back contact of said code receiving relay to measure a predetermined time longer than the time between successive operations of said relay for providing distinctive outputs for closed front and back contact positions respectively, a first pair of switching means, one of said switching means being controlled by the distinctive output of said first timing means for giving an output, and the other switching means controlled by the different output of said second timing means to provide an output, a second pair of switching means, one switching means being controlled by the different output of said first timing means for giving an output and the other switching means being controlled by the distinctive output of said second timing means to provide an output, and checking circuit means controlled by the outputs of said first pair of switching means and by the outputs of said second pair of switching means alternately for maintaining said checking circuit means active.

11. A code rate system having an end of cycle demarcating means providing output pulses to a code validation means and inverter means, the improvement comprises:

first control means operated by the output pulse of said code validation means to provide a distinctive output while said pulse is present and for providing a different output while said pulse is absent, a second control means operated by the output pulse of said inverter means to provide a distinctive output while said pulse is present and for providing a different output while said pulse is absent, a first pair of switching means, one of said switching means being controlled by the distinctive output of said first control means for giving an output, and the other switching means controlled by the different output of said second control means to provide an output, a second pair of switching means, one switching means being controlled by the different output of said first control means for giving an output and the other switching means being controlled by the distinctive output of said second control means to provide an output, and checking circuit means controlled by the outputs of said first pair of switching means and by the outputs of said second pair of switching means alternately to maintain said checking circuit means active.

References Cited

UNITED STATES PATENTS

| | | | |
|---|---|---|---|
| 3,237,157 | 2/1966 | Higby | 340—146.1 |
| 3,251,990 | 5/1966 | Luhrs | 246—167 |
| 3,272,979 | 9/1966 | Reich | 246—63 |
| 3,428,868 | 2/1969 | Duckitt et al. | 340—47 |

MALCOLM A. MORRISON, Primary Examiner

C. E. ATKINSON, Assistant Examiner

U.S. Cl. X.R.

235—153; 246—63; 340—47